(12) United States Patent
Wang et al.

(10) Patent No.: US 7,414,547 B2
(45) Date of Patent: Aug. 19, 2008

(54) METHOD AND SYSTEM FOR CALIBRATING A ROTARY ENCODER AND MAKING A HIGH RESOLUTION ROTARY ENCODER

(75) Inventors: Wei Wang, Austin, TX (US); Levent Biyikli, Cedar Park, TX (US); Luis A. Aguirre, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/615,459

(22) Filed: Dec. 22, 2006

(65) Prior Publication Data

US 2008/0149816 A1    Jun. 26, 2008

(51) Int. Cl.
    *H03M 1/22*    (2006.01)
(52) U.S. Cl. .......................... 341/7; 341/120
(58) Field of Classification Search .......... 341/7, 341/120, 119, 118; 250/231.13; 355/71
    See application file for complete search history.

(56) References Cited

U.S. PATENT DOCUMENTS

| | | | |
|---|---|---|---|
| 5,401,543 A | 3/1995 | O'Neill et al. | |
| 5,459,578 A | 10/1995 | Park et al. | |
| 5,677,757 A * | 10/1997 | Taniguchi et al. | 355/71 |
| 5,888,594 A | 3/1999 | David et al. | |
| 5,912,999 A | 6/1999 | Brennan, III et al. | |
| 5,949,067 A * | 9/1999 | Sano | 250/231.13 |
| 6,404,956 B1 | 6/2002 | Brennan, III et al. | |
| 6,696,157 B1 | 2/2004 | David et al. | |
| 6,853,772 B2 | 2/2005 | Battiato et al. | |
| 6,882,477 B1 | 4/2005 | Schattenburg et al. | |
| 6,915,044 B2 | 7/2005 | Matthews | |
| 6,995,840 B2 | 2/2006 | Hagler | |
| 7,085,450 B2 | 8/2006 | Biyikli et al. | |
| 2005/0064297 A1 | 3/2005 | Wago | |
| 2005/0218314 A1 | 10/2005 | Urakawa | |
| 2006/0098566 A1 | 5/2006 | David et al. | |

FOREIGN PATENT DOCUMENTS

| | | |
|---|---|---|
| EP | 1 447 714 A2 | 8/2004 |
| WO | WO 2004/072737 A2 | 8/2004 |

OTHER PUBLICATIONS

Solak, H.H. & David, C.; "Patterning of Circular Structure Arrays with Interference Lithography", *Journal of Vacuum Science Technology B* (Nov./Dec. 2003); vol. 21, No. 6; pp. 2883-2887.

* cited by examiner

*Primary Examiner*—Jean B Jeanglaude
(74) *Attorney, Agent, or Firm*—Gregg H. Rosenblatt (57) ABSTRACT

A calibration system for a rotary encoder comprises a rotary encoder disposed on a manufacturing substrate, the rotary encoder including an encoder pattern. The calibration system also includes a calibration pattern written onto a surface of the substrate, the calibration pattern comprising a ring that includes a grating pattern, where a radial position of the grating pattern corresponds to an error value of the position of the encoder pattern. A method of calibrating the errors of a rotary encoder and a method of fabricating a high resolution rotary encoder on a surface of a manufacturing substrate are also provided.

17 Claims, 8 Drawing Sheets

METHOD AND SYSTEM FOR CALIBRATING A ROTARY ENCODER AND MAKING A HIGH RESOLUTION ROTARY ENCODER

BACKGROUND

The present invention relates generally to manufacturing systems. More specifically, the present invention relates to a method and system for calibrating an encoder and for the fabrication of a high resolution rotary encoder using interference lithography.

The demand for new products with more features in smaller areas has resulted in an increasing demand to manufacture smaller features at higher yields. The accuracy of the position information during manufacturing becomes more important in designing the manufacturing systems. For example, roll-to-roll processing has continued to be a preferred manufacturing method because of its cost-effectiveness. Therefore, the position/velocity accuracy in a roll process continues to present a challenge as ever smaller feature sizes are employed.

The position information for such systems is typically obtained from encoders. An optical encoder typically includes an encoder pattern, in the form of a grating, detectors and registration electronics. In a rotary encoder, the encoder pattern or the grating is typically written at the edge of disk on a planar substrate. Encoder patterns are often periodic structures, typically in the form of lines (i.e., similar to a grating structure) equally spaced apart from each other. The spacing of the lines used in the encoders can vary from hundreds of nanometers to tens of microns. Thus, the resolution of a rotary encoder is determined by its pitch and the length of its grating. Although a smaller line spacing is usually chosen for higher resolution, the accuracy in its line spacing can still be a limiting factor on the highest achievable resolution and accuracy for any given encoder. In fact, such commercially available encoders have inherent limitations in their resolution, their absolute accuracy and their repeatability. In addition, an external disturbance such as mechanical vibrations and temperature fluctuations perturbs the accuracy of the readings. Since conventional encoders are not located next to the substrate where manufacturing takes place, the external disturbances affect the position of the encoder and substrate differently. Therefore, the position readings obtained from the encoders does not reflect the actual position of the substrate to the degree of accuracy required for products with smaller feature sizes. The size of commercially available encoders are generally about 5-7 cm in radius. On the other hand, tape encoders may be written in long lengths through a step and repeat lithography techniques or some type of micro-replication printing process. However, this tape encoder when mounted to a cylindrical role will have a discontinuity at the splice.

SUMMARY

In one aspect of the present invention, a calibration system for a rotary encoder comprises a rotary encoder disposed on a manufacturing substrate, the rotary encoder including an encoder pattern having a plurality of lines spaced apart by a substantially fixed spacing distance and a detection system to detect position information corresponding to a position of the encoder pattern. The calibration system also includes a calibration pattern written onto a surface of the substrate, the calibration pattern comprising a ring that includes a grating pattern, wherein a radial position of the grating pattern corresponds to an error value of the position of the encoder pattern.

In another aspect, a method of calibrating the errors of a rotary encoder for a manufacturing substrate comprises providing a rotary encoder disposed on a manufacturing substrate. Positional information from the rotary encoder is acquired. An interference lithography writing system is provided to write a calibration pattern on at least one surface of the substrate, wherein the writing system includes a controller to receive the positional information from the rotary encoder and to control the writing of the calibration pattern based on the positional information. The calibration pattern is written on the at least one surface of the substrate.

In another aspect, a method of fabricating a high resolution rotary encoder on a surface of a manufacturing substrate comprises disposing a rotary encoder on the manufacturing substrate about a rotation axis, the rotary encoder including a first encoder pattern and a detection system to detect position information corresponding to a position of the first encoder pattern. The positional information from the rotary encoder is acquired. An interference lithography writing system is provided to write a calibration pattern on a first portion of at least one surface of the substrate, wherein the writing system includes a controller to receive the positional information from the rotary encoder and to control the writing of the calibration pattern based on the positional information. The calibration pattern is written on the at least one surface of the substrate. An error detection system is provided having a probe source and a detector to probe and detect error information based on diffraction patterns generated by the calibration pattern when scanned with the probe beam, the error information indicating errors in the positional information of the rotary encoder, wherein the error information is provided to the controller. A second encoder pattern is written on a second portion of the substrate, wherein the interference lithography writing system writes the second encoder pattern based on the positional information and the error information.

In another aspect, a rotary encoder comprises a manufacturing substrate having a continuous encoder pattern, with a pitch of 4 μm or less at a radial position of at least 3 inches (7.6 cm) from the center of the manufacturing substrate, wherein the encoder pattern is formed on a surface of the manufacturing substrate.

The above summary of the present invention is not intended to describe each illustrated embodiment or every implementation of the present invention. The figures and the detailed description that follows more particularly exemplify these embodiments.

While the above-identified drawing figures set forth several embodiments of the invention, other embodiments are also contemplated, as noted in the discussion. In all cases, this disclosure presents the invention by way of representation and not limitation. It should be understood that numerous other modifications and embodiments can be devised by those skilled in the art which fall within the scope and spirit of the principals of this invention. The figures may not be drawn to scale. Like reference numbers have been used throughout the figures to denote like parts.

DETAILED DESCRIPTION

The present invention relates to a method and system for calibrating an encoder and for the fabrication of a high resolution rotary encoder using interference lithography. The method and system can be used to fabricate a high resolution rotary encoder on a large substrate.

As mentioned above, conventional rotary encoders have inherent limitations in accuracy. Also, the resolution of the encoder position information is limited by the number of lines of the pattern. Those errors will be present when directly copying the conventional encoder onto another substrate and additional errors are introduced when using the conventional encoder as a master on a larger manufacturing substrate. According to one aspect of the present invention, a calibration system is provided to map out the inherent errors and calibrate the conventional encoder to improve its accuracy. Moreover, in another aspect, the calibration system can detect and mitigate the position errors of the original encoder pattern, achieving position accuracy higher than those achieved by the commercially available encoders.

Moreover, an exemplary method described herein can be used to manufacture a newly formed encoder pattern on the manufacturing substrate. The encoder pattern can be written very close to the region of interest on the substrate, especially at a location more distant from the center of the substrate. The newly written encoder pattern can provide a measured position at a location where the resolution is needed. With conventional approaches, in contrast, if any error in the master encoder pattern is not detected and compensated, these errors are directly copied (and amplified) into manufacturing process. The typical errors of remote measurements found with commercially available encoders can thus be reduced or eliminated.

In one aspect, a rotary system with a substrate includes a first encoder pattern, for example a commercially available rotary encoder. The positional information from the first encoder pattern can then be used to control the modulation of a writing system that writes a second encoder/calibration pattern on a first area of the substrate. This second encoder/calibration pattern can map the errors of the first encoder pattern. The data generated from the second encoder/calibration pattern can be used to calibrate the commercial encoder. Alternatively, this data can be used to write a new encoder pattern with high resolution.

In a preferred aspect, a method of fabricating a high resolution encoder on a large substrate includes using the information from the calibration system to write a third encoder pattern on a second area of the substrate. The positional information from the first encoder pattern and the error data present in the second encoder/calibration pattern are measured and used to control the modulation of the writing system that writes the new encoder pattern on the second area of the substrate. In this way, a high resolution encoder according to a preferred aspect herein can include over 1 million lines fitted in one revolution as compared to a conventional encoder having about 100,000 lines to about 200,000 lines. These and other aspects of the exemplary fabrication system and method are further described with reference to the illustrations and examples below.

Figure 1:
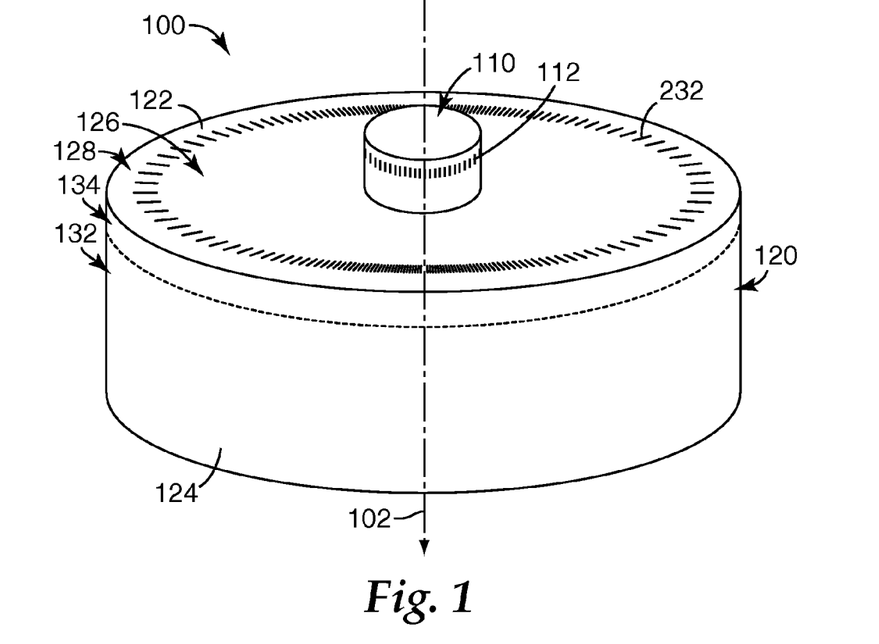
FIG. 1 is an isometric view of an exemplary substrate.

For example, FIG. 1 shows an isometric view of a rotary structure 100 that is used in a manufacturing system. The rotary structure 100 can include a substrate 120 having a conventional encoder structure 110 mounted thereon. Substrate 120 can be a roller, drum, a cylinder, or a disk. For purposes of this description, substrate 120 will be described as an exemplary roller 120, for use in a roll-to-roll manufacturing process. According to a preferred aspect of the present invention, roller or substrate 120 includes an encoder pattern 232 formed using the exemplary methods described herein. In particular, the exemplary methods described herein can utilize an existing encoder pattern that is mapped to provide error information that is used to calibrate the encoder and/or to form a new encoder pattern on a larger roller structure.

Substrate 120 includes a flat surface 122 and a curved perimeter surface (also referred to as a drum surface) 124. A conventional encoder 110 is disposed on substrate 120 about the rotation axis 102 (corresponding to the position of the rotary drive shaft, not shown). Conventional encoder 110 will include a periodic pattern of lines 112 spaced apart by a substantially fixed spacing, the pitch (e.g., a 1 µm pitch, 2 µm pitch, 3 µm pitch, a greater pitch, or other pitch), and a grating length of less than about 40 cm that provides the resolution of the positional data. By "substantially fixed" it is meant that there will be some differences in spacing distances as is apparent from the description herein. Based on the encoder readings, the manufacturer can determine the rotational position of the substrate to the degree of accuracy of the encoder. The encoder pattern for an exemplary conventional encoder can be located at a radial distance of about 2.5-3.5 cm from the rotation axis.

In some aspects of the present invention, this conventional encoder can provide the starting pattern that is used as a baseline for the high resolution encoder pattern to be written. For example, in an exemplary aspect, the position information obtained from the encoder pattern 112 of conventional encoder 110 is used to write one or more additional encoder patterns on one or both of surfaces 122 and 124. For example, a second encoder pattern can be formed on region 126 and/or region 128 of surface 122. Alternatively, or also, an additional encoder pattern can be formed on region 134 of drum surface 124. The placement of the additional encoder pattern can be made based on its proximity to the manufacturing area, thereby improving the manufacturing accuracy. In a further alternative, the substrate can include a groove or channel (not shown) and the additional encoder pattern can be written on an inward or outward facing surface of that groove or channel.

Figure 2:
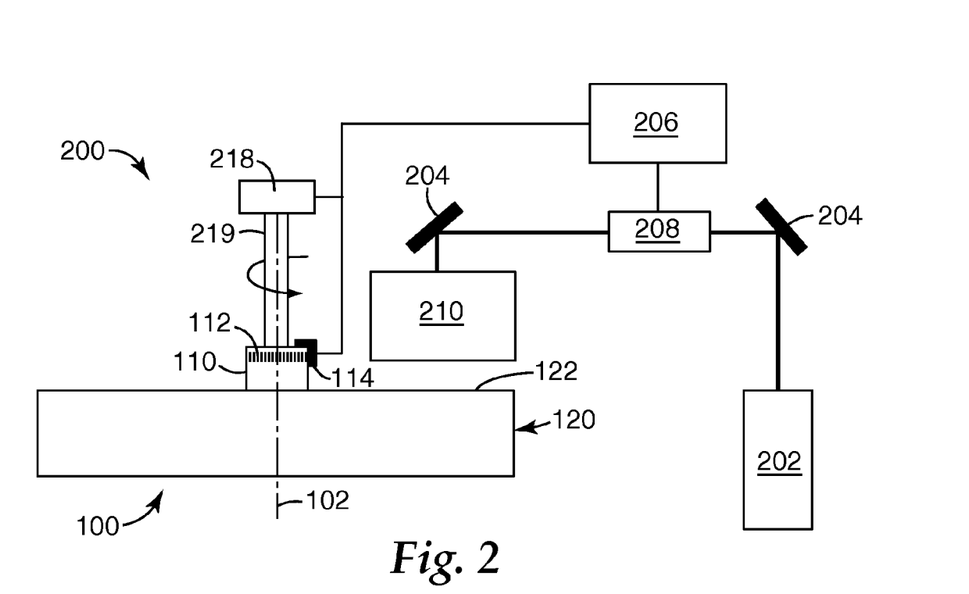
FIG. 2 is a schematic view of an exemplary writing system according to an aspect of the present invention.

As shown in FIG. 2, an encoder/calibration pattern writing system 200 can be used to form the additional encoder/calibration pattern on surface 122 of substrate 120. A laser 202 generates actinic radiation that is directed to the surface of interest, in this example, surface 122, via one or more mirrors 204. Preferably, a UV source is used and can be modulated via a modulator 208, such as an acousto-optic modulator. The modulation pattern is controlled by a controller 206, which receives positional information via encoder 110, specifically the detector/registration electronics 114.

In operation, a probe beam is used to probe the periodic structures of the conventional encoder pattern 112. As the written structures of pattern 112 pass through the probe beam generated by detector/registration electronics 114, a signal in the form of a sine wave can be obtained. This signal typically has twice the repetition rate as the line spacing or pitch of the encoder pattern. Thus, the position of the pattern can be measured by counting the number of peaks and measuring the phase of the sine wave (e.g., through interpolation). A motor 218 coupled to the drive shaft 219 can rotate the substrate 120 at a predetermined velocity.

An exemplary location for the conventional encoder is near the actuator or the motor that is used to drive or rotate the substrate. In this configuration, a potential phase lag between control signals and the position where the substrate is driven can be minimized.

As mentioned above, an encoder/calibration pattern can be written on at least one of surface 122 and surface 124 of substrate 120. In an exemplary aspect, the surface of interest, here surface 122 (see FIG. 3), can be prepared by e.g., polishing the surface then coating the surface with a conventional photoresist. For example, a spin or coating process can be utilized. The photoresist can then be exposed to the UV light pattern at the desired locations. The photoresist is then developed to form a predetermined pattern. Etching techniques, such as plasma etching or wet chemical etching, can then be used to transfer the pattern from the photoresist to the durable surface to form a permanent encoder/calibration pattern. Alternative techniques can be used to prepare surface 122, including diamond turning and/or polishing. Alternatively one can use a durable photo-sensitive polymer, such as Su-8 photoresist available from MicroChem Corporation (Newton, Mass.), in place of the as-mentioned conventional photoresist for patterning. In this case, the polymer-based pattern is durable enough that no additional etching steps are required after developing the image. Alternatively, the photoresist may be spray coated and dried or applied using a dry film photoresist or a reactive coating that changes refractive index upon exposure to the actinic radiation used to create the inventive encoder pattern.

In another embodiment, the substrate may be coated with a thin contrast layer such as diamond-like glass (as described in U.S. Pat. No. 6,696,157); diamond-like carbon (as described in U.S. Pat. Nos. 5,401,543 and 5,888,594); or a sputter deposited, electroplated or electrolessly plated metal. The contrast layer can then be overcoated with a layer of photoresist. The surface can be exposed to patterned actinic radiation that corresponds to the photoresist being used. The photoresist is developed using conventional techniques to expose regions of the contrast layer. The exposed regions of the contrast layer can be removed using known etch techniques such as chemical etching plasma etching or combinations thereof. The remaining photoresist is then removed to reveal a patterned contrast layer.

Optionally, a protective scratch resistant coating may be applied over the resulting patterned layer in either a patterned permanent photoresist, patterned contrast layer or patterned index change coating to protect the encoder pattern in use and handling.

Figure 3:
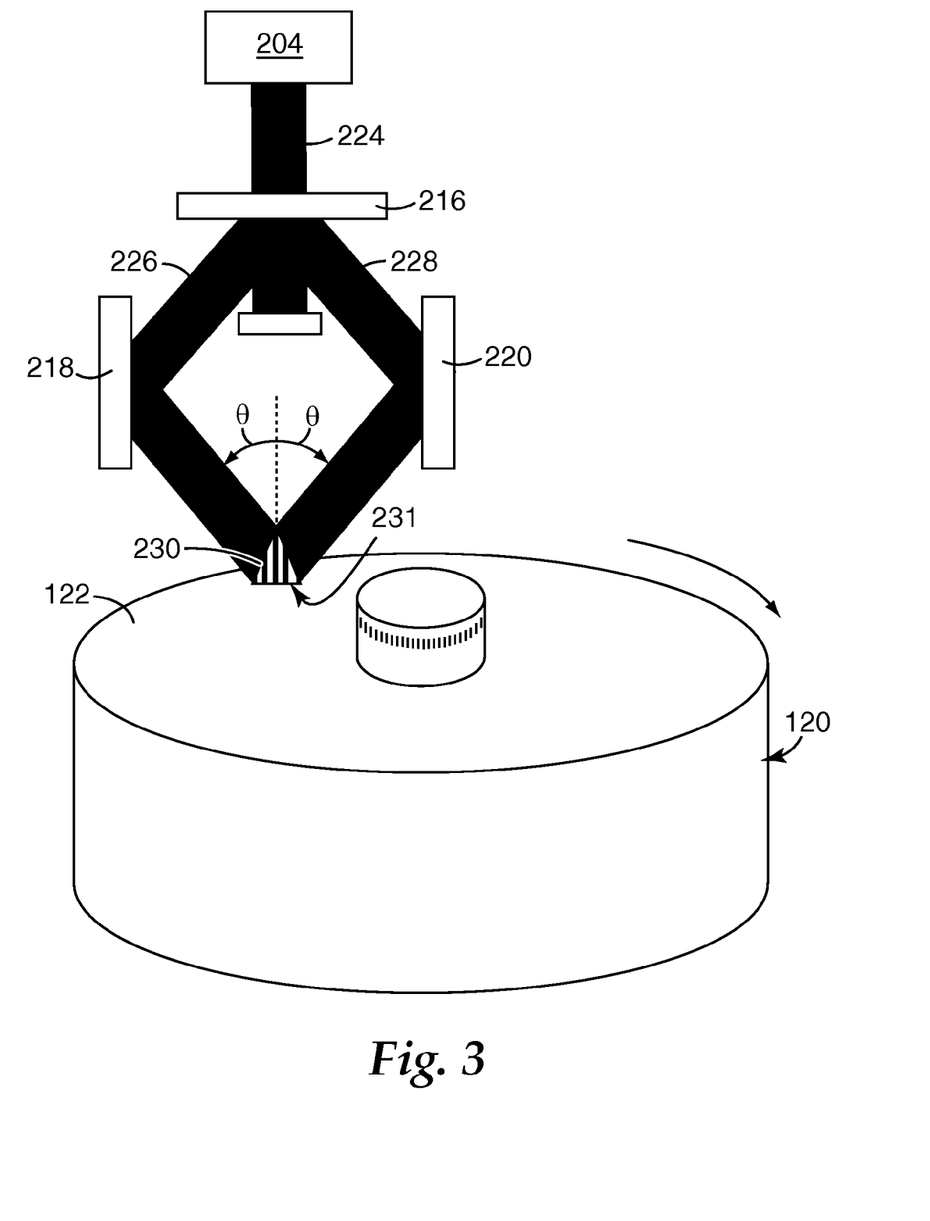
FIG. 3 is a schematic view of an exemplary interference lithography system.

In a preferred aspect, the new encoder/calibration pattern is formed using interference lithography. FIG. 3 shows an exemplary Talbot Interferometer 210 that can be used to create a desired interference pattern on surface 122. Interferometer 210 includes beam splitter 216, such as a phase mask, and reflectors 218 and 220. Light source 204, which is typically a source of actinic radiation such as a UV laser, provides input beam 224 to interferometer 210.

Beam splitter 216 splits input beam 224 into two writing beams, first write beam 226 and second write beam 228. Typically, input beam 224 is split such that half of input beam 224 is transmitted from beam splitter 216 as first write beam 226 and half of input beam 224 is transmitted from beam splitter 216 as second write beam 228. First write beam 226 is directed to substrate 120 by reflector 128, and second write beam 228 is directed to the substrate 120 by reflector 220. The angle of incidence of first write beam 226 and second write beam 228 on substrate 120 is based on the point and angle of incidence of first write beam 226 on reflector 218 and of second write beam 228 on reflector 220. First write beam 226 and second write beam 228 are reflected from reflectors 218 and 220, respectively, toward substrate 120 at an inter-beam half angle, θ. First write beam 226 and second write beam 228 intersect at intersection plane 230 and interfere with each other at region 232 in substrate 120. Alternative interferometer geometries are described in U.S. Pat. Nos. 6,853,772 and 6,915,044.

In a preferred aspect, the interference lithography technique usually comprises a step and repeat process that includes the stitching together of many exposures to make a pattern of significant length, especially when the pattern is formed around the drum surface 124 of the roller. Alternatively, other interference lithography techniques and interferometers, such as using a phase mask near the surface of interest, can also be utilized. A phase mask diffracts an incident laser beam into different orders and typically enhances the intensity of the +1 and −1 (first) order beams while suppressing the other orders. When a phase mask is positioned near the surface of interest, the +1 and −1 (first) order beams interfere at the surface, thus generating the predetermined pattern on the surface.

Alternatively a laser, mechanical or electro-mechanical scribing process may be used to create the encoder pattern. The alternative process is usually performed for one or a few lines at a time and can require a substantial time to create a line. Also, this process can require the user to stop the rotation of the substrate when creating the encoder pattern, thus requiring use of a precise step-motor and control system to account for inertial effects when writing encoder patterns on rollers used for roll-to-roll manufacturing processes.

The exposure of the photoresist or other reactive coating to the patterned actinic radiation causes a change in the chemistry or at least one property of the material (e.g., crosslinking or scission of polymer chains, or a permanent increase in the refractive index of the material) on optical substrate 120, creating a structure 232 according to the exposure pattern.

The pattern 232 may be written using a step and repeat process as described above or in a continuous process. In alternative aspects, the continuous process may include alternative exemplary types of continuous processes to provide a high resolution lithographic pattern. For example, the velocity of the substrate can be tightly controlled and the interference pattern can be modulated in time. U.S. Pat. No. 5,912,999 describes a constant velocity process used to write long Bragg gratings in optical fiber. A second type of continuous process monitors the position of the substrate and uses this information to modulate the interference pattern. An example of this continuous process is described in U.S. Pat. No. 7,085,450.

The period of a structure formed by an interferometer can be described by the well-known Bragg equation $$2n\Lambda_B \sin\theta = m\lambda \quad \text{(Eq. 1)},$$

where $\Lambda_B$ is the period, $\theta$ is the half-angle between the write, $\lambda$ is the wavelength of the write beams used to form structure 232, m is an integer representing the diffraction order, and n is the index of refraction. In the example Talbot Interferometer, the period $\Lambda_B$ can be tuned by adjusting the reflectors 218 and 220, which changes the half-angle $\theta$. Therefore, patterns with any period greater than half $\lambda$ can be fabricated in theory.

Figure 4A:
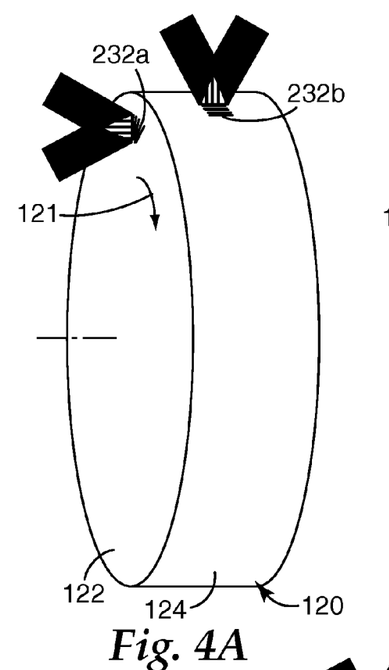
FIGS. 4A-4C show schematic views of a pattern being written on an exemplary substrate according to an aspect of the present invention.
Figure 4B:
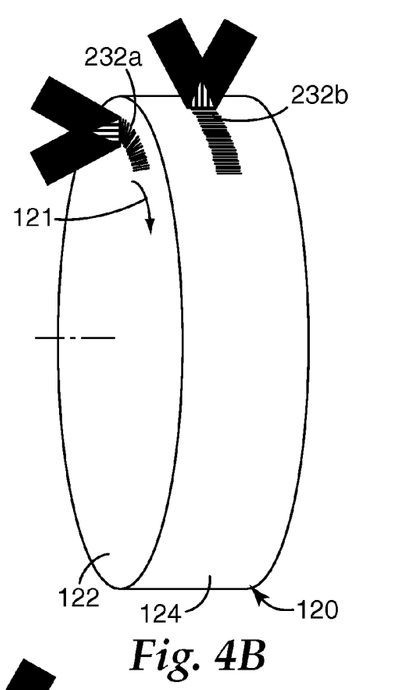
Figure 4C:
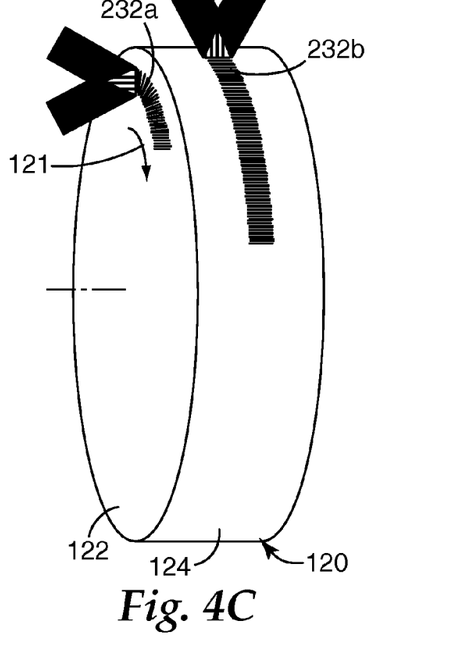

To form structure 232 on a larger area of optical substrate 120, optical substrate 120 can be moved relative to intersection plane 230 (or vice versa) in order to stitch together the periodic structure on the complete surface. As mentioned above, the exposed portion of surface 122 can be treated with a photoresist, exposed, then developed. For example, as shown in FIGS. 4A-4C, the substrate 120 can be moved in the direction of arrow 121 during the writing process, with FIG. 4A representing the beginning of the process, and FIGS. 4B and 4C representing the process at later times. As shown in FIGS. 4A-4C, the patterns 232a and 232b can be formed in either (or both) surfaces 122 and 124. In a preferred aspect, the substrate 120 is mounted on a high precision motor with an air bearing to reduce vibrational effects.

Figure 5A:
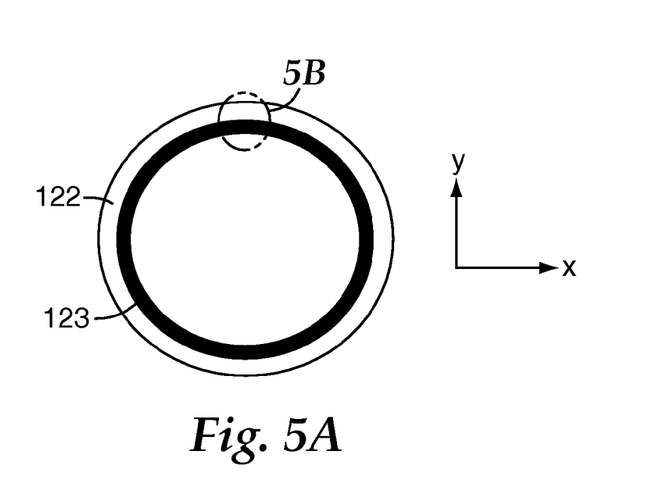
FIGS. 5A and 5B respectively show an exemplary ring pattern and a close-up view of the interference pattern according to an aspect of the present invention.
Figure 5B:
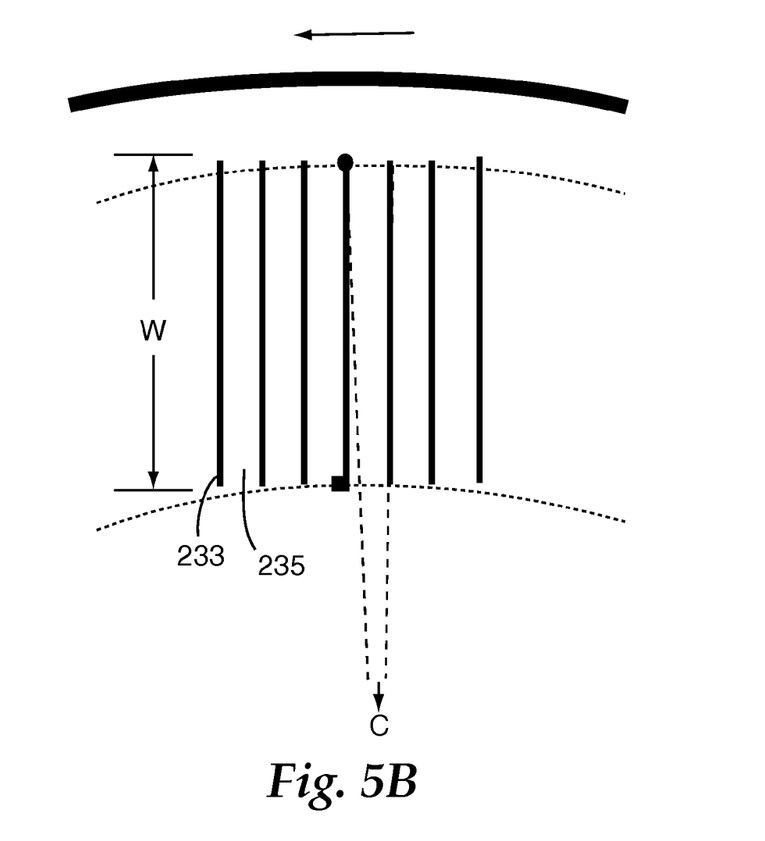

In an exemplary aspect, the pattern 232 is written on flat surface 122 based on the encoder pattern 112 of the first encoder. Due to its finite width, the radiation beam exposes each point multiple times when the drum or disc 120 rotates in the direction of arrow 121. The UV interference pattern generated by the Talbot Interferometer goes in and out of phase with the encoder/calibration pattern and causes a washout of a portion or portions of the encoder/calibration pattern. In order to cascade (stitch) the UV pattern across the whole substrate surface 122 in the form of a ring 233 as shown in FIGS. 5A and 5B, the UV beam is modulated (turned on and off) based on the corresponding position of the conventional encoder pattern 112. A portion of the individual lines 235 (such as a single interference pattern) that make up ring 233 is shown in close-up view in FIG. 5B. This illustration shows that while a radial pattern is being written, each individual exposure comprises an exposure by a linear pattern created by the Talbot Interferometer.

Referring back to FIG. 2, positional data from the conventional encoder 110 is measured by detector/registration electronics 114 and sent to controller 206 and is used to provide a modulation signal for modulator 208. Thus, as the beam moves along the x-direction (the x-y axis is shown FIG. 5A) and the UV light source is modulated, the beam size along the x-direction in FIG. 5A determines the number of exposures for any given point. Based on the beam size, each point in the written pattern experiences in-phase exposures multiple times, leading to an averaging effect of the errors of the original encoder 110. For example, for a beam with a 100 μm width in the x-direction and an encoder pattern with a 2 μm pitch, each line is averaged fifty times. By adjusting the spacing of the interference pattern, it is possible to write a larger, finer pitch encoder pattern than the first encoder 110.

Depending on the size of the UV pattern to be written as the new encoder/calibration pattern, any position errors from the first encoder 110 will be averaged and moreover, those errors will also be convolved with the fixed spacing of the interference fringes. As each line on the encoder/calibration pattern 233 is generated by multiple exposures, any in-phase errors will accumulate from the first encoder pattern 112. If the accumulated errors are more than the half of the spacing of the interference fringes, the whole pattern may be washed out. This washout and tolerance on its spacing depend on the beam size (in the x-axis direction) used to form the desired UV pattern. Thus, this effect determines the minimum encoder pattern pitch that can be written from the original grating.

Figure 6A:
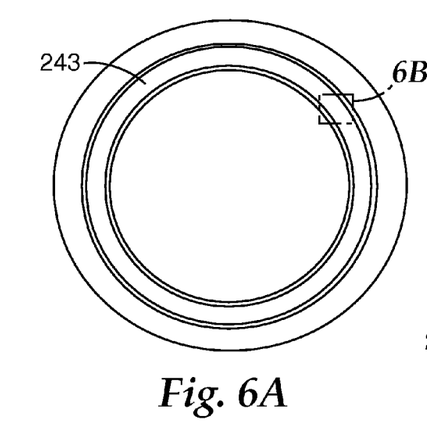
FIGS. 6A-6D show schematic views of different ring patterns and close-up views of the corresponding interference pattern according to alternative aspects of the invention.
Figure 6B:
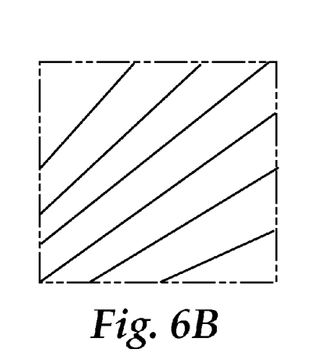

As a further illustration, if there is no error in the first encoder, the pattern writing system will generate the encoder/calibration pattern at the center of the interference pattern, such as in the form of ring 243 as shown in FIG. 6A. The lines on the manufactured encoder pattern 243 are also going to point towards the center of the substrate as shown in the inset of FIG. 6B.

Figure 6C:
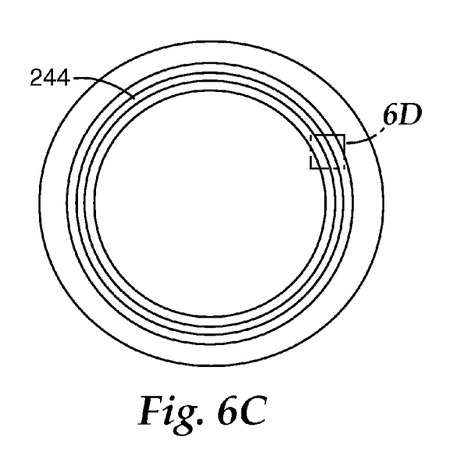
Figure 6D:
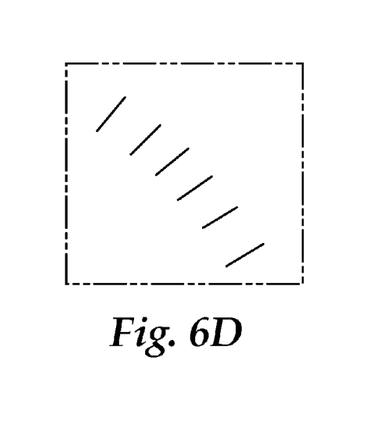

By writing the new encoder/calibration pattern on the flat surface 122 of the substrate, each point travels at different amount, as is shown in FIG. 5A, where the inner tracks travel slower than the outer tracks. Thus, as the writing laser is modulated to cascade the encoder/calibration pattern, due to the speed difference on the inner and the outer tracks, the encoder pattern will not cascade uniformly across the radial tracks. Instead, the formed encoder/calibration pattern will be in the form of a ring, where the modulation of the UV laser matches the speed of the turning substrate at a given radial position. This ring pattern can vary in thickness, as is shown in FIGS. 6A-6D. For example, a thick ring 243 is shown in FIG. 6A, which is generated as a result of using a writing beam with a small width in the x-axis direction. In contrast, FIGS. 6C and 6D show that a thin ring 244 can be generated as a result of using a writing beam with a large width in the x-axis direction. As would be understood by one of skill in the art given the present description, the beam size can be optimized based on the averaging effects and the smearing or washout effect of the fringes. For example, although a larger beam can average out errors from the first encoder, the greater number of fringes may smear the encoder/calibration pattern such that a pattern of useful size (width) may not be written.

In addition, the pitch of the encoder/calibration pattern can also vary across the width of the ring, based on its radial position.

In another example, assume that a user desires to write a new encoder pattern on the surface 122 of a substrate 120 having a 2 μm pitch at a radial distance of 230 mm away from the center of the ring, with a 100 μm beam size. Due to the speed difference on the inner and outer rings, each track will move a different distance (i.e. be at different position in the x-direction). Therefore at any moment, only a portion of the encoder/calibration pattern will be in phase with the interference pattern generated by the Talbot Interferometer. Outside that ring, the patterns are washed out. The position and the thickness of the ring depend on the beam size, the pitch size and the accuracy of the position reading from the first encoder.

Table 1 below shows a range of tolerances as a function of beam size and Table 2 shows the actual distance traveled for different tracks when the point 230 mm away from the center travels 2 μm.

TABLE 1

| Beam Size (μm) | No. of Fringes | Spacing Tolerance (μm) |
|---|---|---|
| 4 | 2 | 1.000 |
| 10 | 5 | 0.400 |
| 20 | 10 | 0.200 |
| 40 | 20 | 0.100 |

TABLE 1-continued

| Beam Size (μm) | No. of Fringes | Spacing Tolerance (μm) |
|---|---|---|
| 80 | 40 | 0.050 |
| 100 | 50 | 0.040 |
| 200 | 100 | 0.020 |
| 500 | 250 | 0.008 |
| 1000 | 500 | 0.004 |

TABLE 2

| Distance to Center (mm) | Spacing (μm) |
|---|---|
| 239 | 2.072 |
| 238 | 2.064 |
| 237 | 2.056 |
| 236 | 2.048 |
| 235 | 2.040 |
| 234 | 2.032 |
| 233 | 2.024 |
| 232 | 2.016 |
| 231 | 2.008 |
| 230 | 2.000 |
| 229 | 1.192 |
| 228 | 1.984 |
| 227 | 1.976 |
| 226 | 1.968 |
| 225 | 1.960 |
| 224 | 1.952 |
| 223 | 1.944 |
| 222 | 1.936 |
| 221 | 1.928 |

Referring to Table 1, for a 100 μm beam size along the x-axis (as defined in FIG. 5B), and a 2 μm pitched structure, the tolerance of positional accuracy is 0.04 μm. Accordingly, a 2 μm pitch encoder/calibration pattern (in this case, centered at a radial distance of 230 mm from the axis of rotation), will cascade as long as the spacing is within the tolerance. Therefore only gratings with pitches between 1.96 μm and 2.04 μm can be written on the substrate. At these two extremes (and farther), the written pattern will be washed out. Referring to Table 2, a 2-μm-pitch grating is centered at 230 mm from the axis of rotation, while a 1.96-μm-pitch grating and a 2.04-μm-pitch grating sit at radial distances of 225 mm and 235 mm, respectively. Thus, if a 2-μm-pitch encoder pattern is to be written at a radial distance of 230 mm, the width (w) of the pattern will be about 10 mm. This pattern width is independent of the size of the beam across the y-axis (see FIG. 5B).

Figure 7:
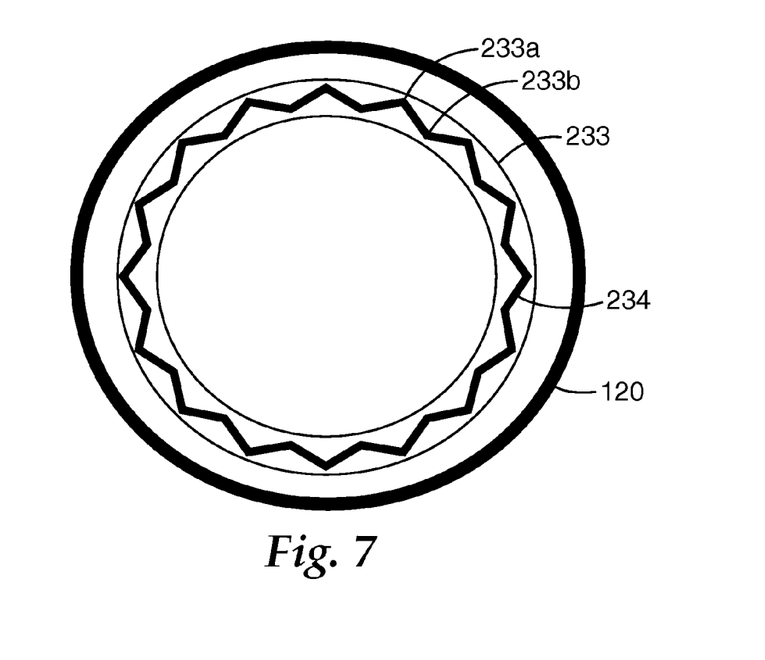
FIG. 7 is a schematic view of an exemplary encoder/calibration pattern according to an aspect of the present invention.

Moreover, if the original encoder 110 reads an encoder position that is less than the actual position, the corresponding portion of the manufactured encoder/calibration pattern 233 will be located at a further radial distance than the center of the pattern 233. For example, see pattern location 233a shown in FIG. 7. Similarly, if the original encoder reads a position greater than the actual position, the corresponding portion of the manufactured encoder pattern 233 will be located at a closer radial distance. For example, see pattern location 233b in FIG. 7. Therefore, any errors of the encoder 110 in the system will result in the written encoder/calibration pattern 233 having a wave-like, oscillating structure 234 as is shown in FIG. 7.

As mentioned previously, the correlation between the original encoder error and the resulting new encoder/calibration pattern position provides the opportunity to systematically map the errors of the first (original) encoder and calibrate that pattern accordingly. These calibrations can be used to supplement the encoder position information provided with the first (original) encoder. For example, an additional error detection unit (described in more detail below) can be utilized to probe and measure the written encoder/calibration pattern. These error measurements can be added to the encoder software routine of the first (original) encoder to provide more accurate position information during use of the first (original) encoder. Thus, the accuracy of the first (original) encoder can be significantly improved.

Alternatively, the new encoder/calibration pattern can be used to manufacture a high resolution encoder pattern that is provided on a larger substrate, closer to the area of manufacturing.

Figure 8:
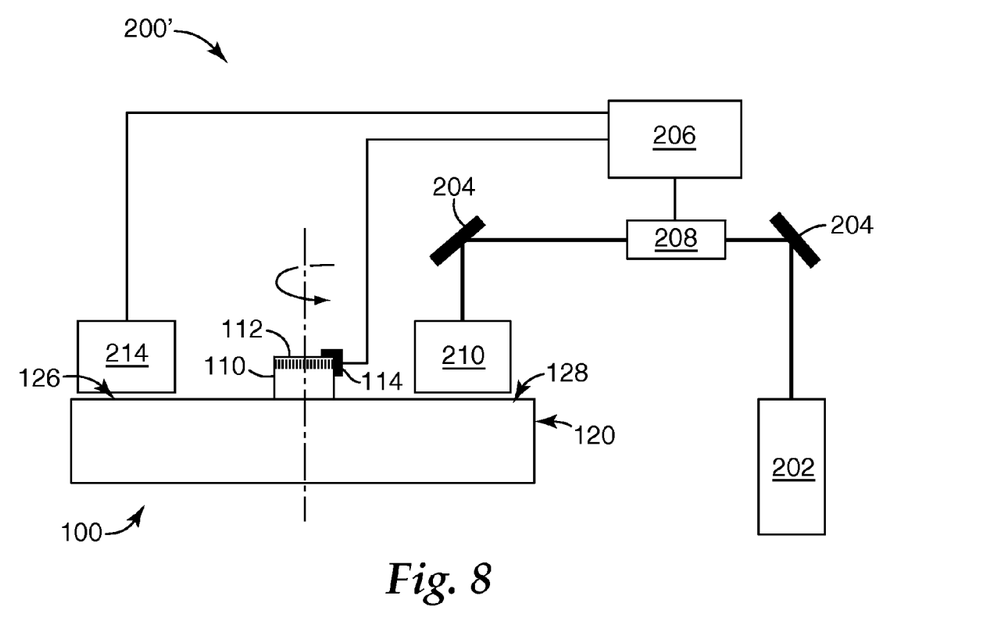
FIG. 8 is a schematic view of an exemplary writing system according to another aspect of the present invention.

For example, as shown in FIG. 8, an encoder pattern writing system 200' can be used to form a high resolution encoder pattern on surface 122 of substrate 120. Alternatively, although not specifically shown in this exemplary view, system 200' can be used to write the further calibrated encoder pattern on curved or drum surface 124 of substrate 120. Similar to system 200 described above, a laser 202 generates actinic radiation, preferably a UV light pattern, which is directed to the surface of interest, in this example, surface 122, via one or more mirrors 204. In this embodiment, the encoder/calibration pattern used for error detection is written on section 126 of substrate 120, whereas the new encoder pattern will be written closer to the perimeter on section 128 of the substrate. The UV source is modulated via a modulator 208, such as an acousto-optic modulator. The modulation pattern is controlled by a controller 206, which receives positional information via encoder 110, specifically the detector/registration electronics 114.

Figure 9:
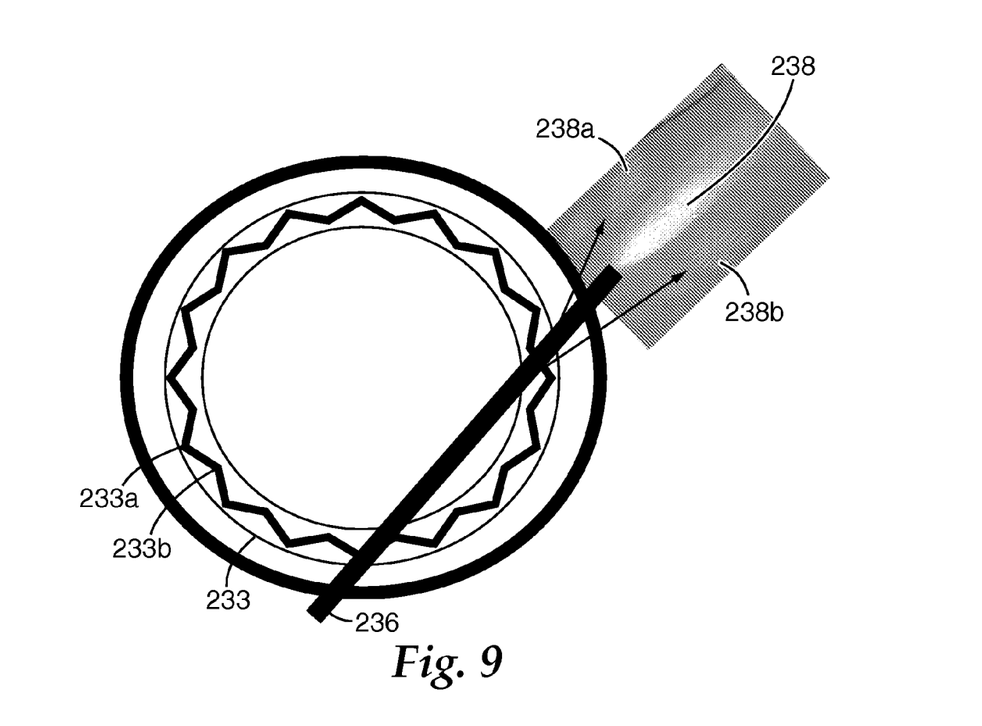
FIG. 9 is a schematic view of an exemplary encoder/calibration pattern being probed by a probe beam according to another aspect of the present invention.

Further, the controller 206 receives additional control signals from error detection unit 214. The error detection unit 214 includes a probe beam and a detector to probe the encoder/calibration pattern written on section 126 of substrate 120. As shown in FIG. 9, the encoder pattern 233 can reveal the errors of the starting encoder pattern 112. For example, a probe beam 236 scanning pattern 233 will diffract into pattern 238, with first order patterns 238a and 238b, only where a grating is formed. The position of the formed grating provides a measurement of the actual velocity of the rotating substrate. In most conventional applications, the velocity is calculated based on the position information obtained from the encoder. The errors in the velocity reflect the position errors in the encoder. The errors in the encoder and additional errors in the calculations (where velocity is the derivative of the position information) do not provide as accurate a measurement of the velocity.

Based on the radial position of the grating structure in pattern 233, a real time measurement of the error of the starting encoder pattern 112 can be relayed to the controller 206 to calibrate the signal generated by encoder 110 (e.g., by generating an error signal used in conjunction with the modulation signal from encoder 114). For example, if the grating pattern is located at a radial position towards the outer portion of the pattern, such as at position 233a, the error detection unit can measure that the encoder/calibration pattern is displaced from the radial center position of the ring, thus providing error data that can be combined with the encoder signal from the encoder 110. Thus, the corrected position of the encoder is used to modulate the writing beam.

In this manner, an additional encoder pattern can be written on area 128 of the substrate 120 using the interference lithography system 210, such as the Talbot Interferometer described above. The surface 128 can be prepared as described above (e.g., polished, coated with a photoresist, exposed, then developed). Alternatively, development of the surface may not be necessary as the indices of the exposed regions are changes such as in optical memory.

Thus, the systems, methods and techniques described herein can be used to produce a high resolution rotary encoder having a continuous pattern with a pitch of 4 µm or less, preferably about 2 µm or less, and more preferably about 1 µm, at a radial position of at least 3 inches (7.6 cm) from the center of the manufacturing substrate, preferably of at least inches (12.7 cm) from the center of the manufacturing substrate, and more preferably at a radial position of at least about 9 inches (22 cm) from the center of the manufacturing substrate. Further, the high resolution rotary encoder pattern can be written directly on the manufacturing substrate (in contrast to a tape encoder pattern, which must be applied to the substrate with an adhesive that is subject to creep effects).

EXAMPLES

In a first experiment, the investigators analyzed and measured a commercially available high resolution rotary encoder. The rotary encoder measured is an ERP 880 encoder, available from Heidenhain Corp. (Chicago, Ill.). The ERP 880 encoder was installed on an air bearing rotary system. The ERP 880 had a pitch of 4 µm. The grating in this encoder has 90,000 lines per one revolution on a disc such that the circumference of the written encoder pattern is 4 µm×90,000=360 mm, or located at a radial position of about 57.3 mm (a second rotary encoder with 225,000 lines, available from Canon, was also tested, but had many more random errors and was not used in further experiments).

Figure 10A:
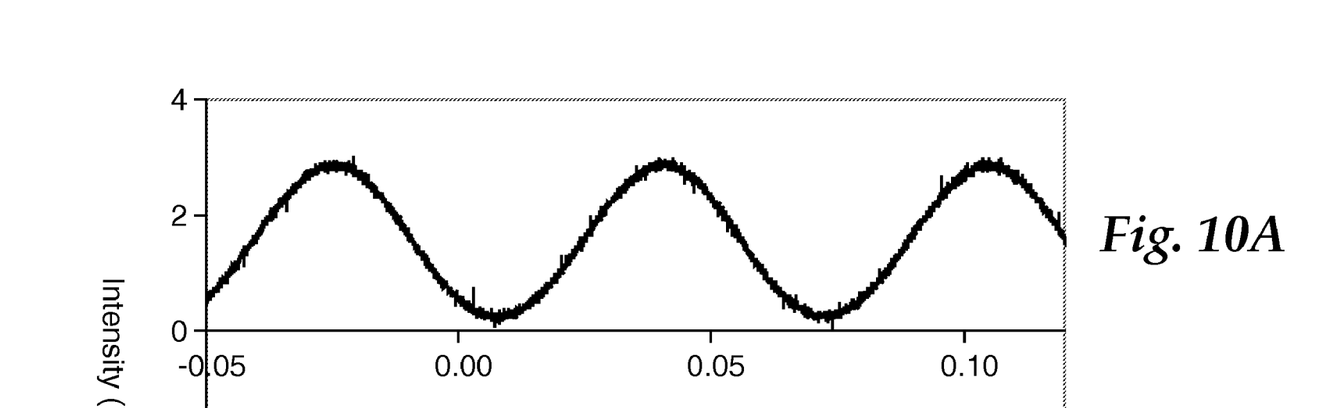
FIG. 10A shows an output signal from a conventional encoder and FIG. 10B shows an output signal from an encoder pattern written in accordance with another aspect of the present invention.

FIG. 10A shows the signal generated by the ERP 880 pattern. This signal has a frequency twice of the number of the grating lines. The position information can be obtained by counting the number of the peaks as the rotary stage turns. In this scheme, the resolution of the encoder is directly proportional to the pitch of the encoder pattern. To increase the resolution of the encoder, the phase of the sine wave can be interpolated. Interpolation can be set to as high as 5000 by using the interpolator available from Heidenhain Corp. Thus, the overall resolution of the encoder can be $\frac{1}{5000}^{th}$ of its pitch size. However, as the signal is interpolated in between the peaks, the errors in interpolation show up as sub-divisional position errors. These interpolation errors can lead to position and velocity accuracy error (as high as 10% of its encoder pattern's pitch). The interpolation error is non-accumulative so it only affects the overall angular position reading as high as 10% of its encoder pattern's pitch. In addition, the interpolation error generates a noise signal that is periodic with the pattern and at low speeds it can be amplified by the control loop.

Figure 10B:
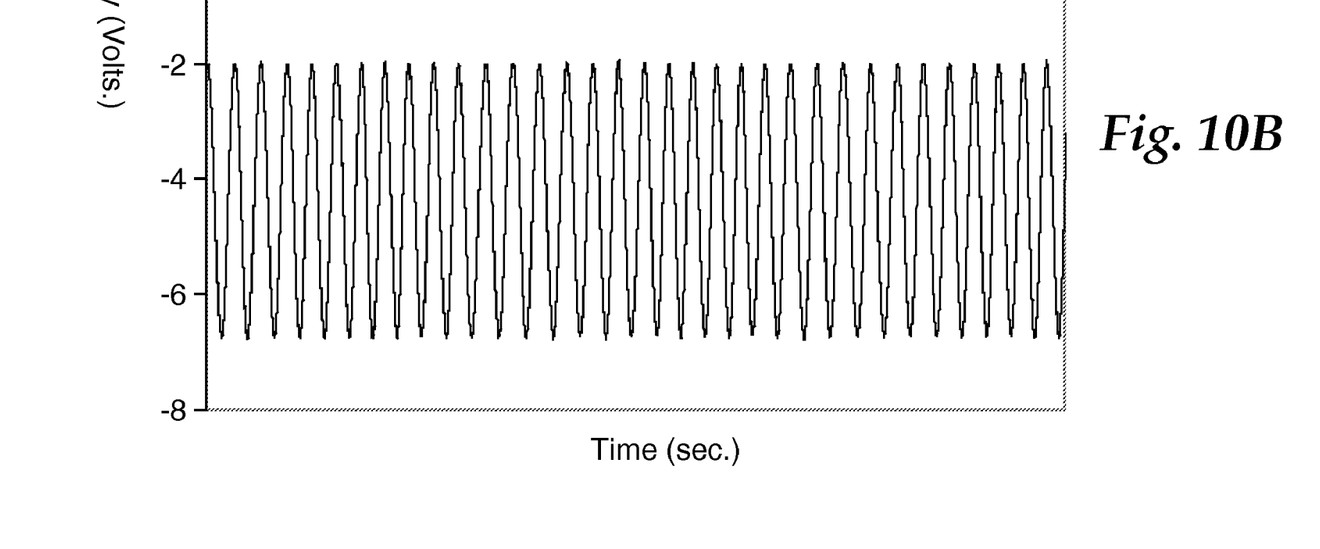

The investigators manufactured a high resolution encoder pattern on a disk substrate in accordance with the method and system described above. The signal from the manufactured encoder is shown in FIG. 10B. A durable photo-sensitive polymer, such as Su-8 photoresist available from MicroChem Corporation (Newton, Mass.) was applied to the curved surface on the drum side of a copper-coated stainless steel cylinder. The encoder/calibration pattern was written using the Talbot interferometer system similar to that shown in FIGS. 2 and 3. The Talbot Interferometer was tuned to 1 micron in its spacing. For every sine wave registered on commercially available encoder, 14 pulses were generated. These pulses had a 25% duty cycle (e.g., 1 indicating laser on and 0 indicating laser off) and based on the phase of the sine wave. Any interpolation errors or noise on the first encoder were averaged by the multiple exposures. A desired duty cycle and waveform (sine wave or square wave) can be implemented and optimized. The new encoder pattern has a pitch of 1 µm and was located at a radial position of about 9 inches (22 cm) from the center of the substrate.

The overall resolution of the new encoder was measured to be about 14 times greater than that of the ERP 880. A portion of the increase in the resolution of the new encoder is due to the difference in radial distances –2.25 inch for the ERP 880 and about 9 inches (22 cm) for the new encoder. Additionally, the difference in pitch of the new encoder (1 µm) versus the pitch of the ERP 880 pattern (4 µm) corresponds to an additional increase in resolution by a factor of four.

The absolute accuracy of these two encoders was also compared by using a capacitance gauge. This capacitance gauge has a resolution of about 1 nm and an absolute accuracy of better than 10 nm about 0.01 arcseconds. The measurement range of the capacitance gauge is small, about 60 µm (or 60 arcseconds). Measured readings for the new encoder showed no discernable errors as compared to the capacitance gauge.

Although the present invention has been described with reference to preferred embodiments, workers skilled in the art will recognize that changes may be made in form and detail without departing from the scope of the invention.

We claim:

1. A calibration system for a rotary encoder, comprising: a rotary encoder disposed on a manufacturing substrate, the rotary encoder including an encoder pattern having a plurality of lines spaced apart by a substantially fixed spacing distance and a detection system to detect position information corresponding to a position of the encoder pattern; and
a calibration pattern written onto a surface of the substrate, the calibration pattern comprising a ring that includes a grating pattern, wherein a radial position of the grating pattern corresponds to an error value of the position of the encoder pattern.

2. The calibration system of claim 1, further comprising an error detection system to probe and detect diffraction patterns generated by the grating pattern of the calibration pattern.

3. The calibration system of claim 1, wherein the manufacturing substrate comprises a roller having a flat surface and a curved surface, wherein the calibration pattern is disposed on one of the flat surface and the curved surface.

4. The calibration system of claim 3, wherein the calibration pattern is disposed on a surface of the manufacturing substrate at a first radial distance from the center of the manufacturing substrate that is greater than a second radial distance of the encoder pattern from the center of the manufacturing substrate.

5. The calibration system of claim 4, wherein the ring is formed on a flat surface of the substrate and wherein the grating pattern of the ring varies in radial distance from the center of the manufacturing substrate as a function of its angular position.

6. The calibration system of claim 1, wherein the calibration pattern is disposed proximate to a manufacturing area of the substrate.

7. A method of calibrating the errors of a rotary encoder for a manufacturing substrate, comprising:
providing a rotary encoder disposed on a manufacturing substrate;
acquiring positional information from the rotary encoder;
providing an interference lithography writing system to write a calibration pattern on at least one surface of the substrate, wherein the writing system includes a controller to receive the positional information from the rotary encoder and to control the writing of the calibration pattern based on the positional information; and writing the calibration pattern on the at least one surface of the substrate.

8. The method of claim 7, further comprising:
providing an error detection system having a probe source and a detector to probe and detect error information based on diffraction patterns generated by the calibration pattern when scanned with the probe beam, the error information indicating errors in the positional information of the rotary encoder.

9. The method of claim 7, wherein the interference lithography writing system comprises a Talbot Interferometer.

10. The method of claim 7, wherein the calibration pattern is disposed on the at least one surface of the manufacturing substrate at a first radial distance from the center of the manufacturing substrate that is greater than a second radial distance of the encoder pattern from the center of the manufacturing substrate.

11. The method of claim 7, wherein the calibration pattern comprises a ring that includes a grating pattern, wherein a radial position of the grating pattern corresponds to an error value of the position of the encoder pattern.

12. The method of claim 7, wherein the interference lithography writing system further comprises a UV light source and a modulator, wherein the modulator receives a modulation signal from the controller and modulates a light signal generated by the UV light source based on the modulation signal.

13. The method of claim 7, wherein the step of writing the calibration pattern on the at least one surface of the substrate comprises stitching an interference pattern on the at least one surface while rotating the substrate at a first velocity.

14. The method of claim 7, further comprising treating the at least one surface of the substrate with a contrast layer.

15. A method of fabricating a high resolution rotary encoder on a surface of a manufacturing substrate, comprising:
disposing a rotary encoder on the manufacturing substrate about a rotation axis, the rotary encoder including a first encoder pattern and a detection system to detect position information corresponding to a position of the first encoder pattern;
acquiring the positional information from the rotary encoder;
providing an interference lithography writing system to write a calibration pattern on a first portion of at least one surface of the substrate, wherein the writing system includes a controller to receive the positional information from the rotary encoder and to control the writing of the calibration pattern based on the positional information;
writing the calibration pattern on the at least one surface of the substrate;
providing an error detection system having a probe source and a detector to probe and detect error information based on diffraction patterns generated by the calibration pattern when scanned with the probe beam, the error information indicating errors in the positional information of the rotary encoder, wherein the error information is provided to the controller; and
writing a second encoder pattern on a second portion of the substrate, wherein the interference lithography writing system writes the second encoder pattern based on the positional information and the error information.

16. The method of claim 15, wherein the calibration pattern is disposed on the at least one surface of the manufacturing substrate at a radial distance from the center of the manufacturing substrate that is greater than a radial distance of the first encoder pattern from the center of the manufacturing substrate.

17. The method of claim 15, wherein the manufacturing substrate comprises a roller having a flat surface and a curved surface, wherein the calibration pattern is disposed on one of the flat surface and the curved surface and the second encoder pattern is disposed on one of the flat surface and the curved surface.

* * * * *

UNITED STATES PATENT AND TRADEMARK OFFICE
CERTIFICATE OF CORRECTION

PATENT NO. : 7,414,547 B2 Page 1 of 1
APPLICATION NO. : 11/615459
DATED : August 19, 2008
INVENTOR(S) : Wei Wang

It is certified that error appears in the above-identified patent and that said Letters Patent is hereby corrected as shown below:

<u>Column 7,</u>
Line 8, after "write" insert -- beams --.

<u>Column 11,</u>
Line 7, before "inches" insert -- 5 --.

Signed and Sealed this

Twentieth Day of January, 2009

JON W. DUDAS
*Director of the United States Patent and Trademark Office*